INVENTOR.
Eugene J. Bevers
BY
Paul Fitzpatrick
ATTORNEY

United States Patent Office 3,332,232
Patented July 25, 1967

3,332,232
FUEL CONTROL
Eugene J. Bevers, Indianapolis, Ind., assignor to General Motors Corporation, Detroit, Mich., a corporation of Delaware
Filed June 21, 1965, Ser. No. 465,636
7 Claims. (Cl. 60—39.28)

ABSTRACT OF THE DISCLOSURE

A gas turbine fuel control in which fuel is limited during acceleration primarily by compressor discharge pressure, with fuel-air ratio enrichment beginning above the surge-susceptible speed range. A barometric device enriches fuel in the lower speed range at higher altitudes.

---

My invention is directed to fuel controls for gas turbine engines, particularly those of aircraft which operate under varying atmospheric pressures. The invention is embodied in an addition to a previously known fuel control which has means responsive to compreesor discharge pressure of the gas turbine to control fuel during acceleration and a governor or governors to control fuel during steady state running and prevent overspeed. The prior fuel control also includes means to enrich the fuel mixture or, in other words, increase the ratio of fuel to air, during acceleration of the engine after a predetermined speed level of the engine is reached.

My invention involves means to increase acceleration fuel flow with altitude at higher altitudes below the speed at which the previously mentioned enrichment takes place. This new feature is highly desirable to compensate for the deterioration of performance of the engine under lower atmospheric pressures and to improve the acceleration characteristics of the engine at altitude. With the previous control, the ability of the engine to accelerate deteriorates undesirably with altitude. Much improved acceleration of the engine at higher altitudes is obtained with my invention.

Thus, it may be stated generally that my invention involves means for raising the fuel-air ratio of an engine, for acceleration through a low speed range, progressively as altitude increases. More particularly, my invention involves means for incorporating this feature in a particular type of control currently employed with aircraft engines, one in which a fuel metering valve is controlled by air pressures derived from the outlet of the engine compressor and modulated by speed-responsive means in the fuel control.

The nature of the invention and the advantages thereof will be apparent to those skilled in the art from the succeeding detailed description of the preferred embodiment of the invention and the accompanying drawings thereof.

Figure 1:
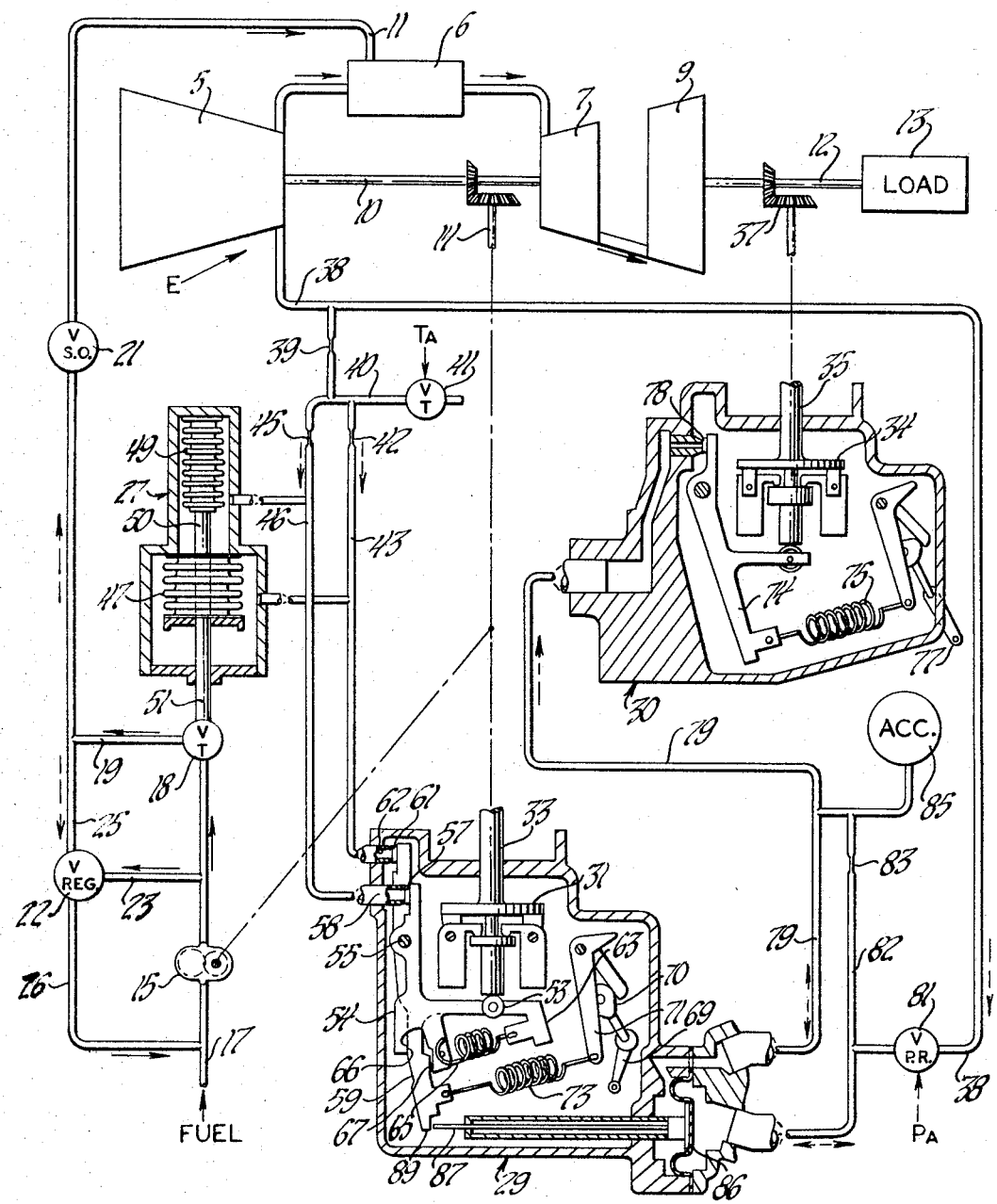
FIGURE 1 is a schematic diagram of the basic elements of a prior art fuel supply and control system associated with a gas turbine engine of the gas-coupled or free turbine type.

Referring first to FIGURE 1, a gas turbine engine E, illustrated schematically, includes a compressor 5, combustion apparatus 6, a gas generator turbine 7, and a power turbine 9. The gas generator turbine drives the compressor through a shaft 10 and the compressor supplies air to the combustion apparatus. Fuel supplied through a line 11 is burned in the combustion apparatus and the resulting combustion products flow first through the gas generator turbine 7 and then through the power turbine 9, from which they are exhausted to atmosphere. The power turbine is coupled by suitable transmission means indicated by a shaft 12 to any load device 13 which may, for example, be a lifting or propelling rotor of an aircraft.

The gas generator turbine 7 is geared to an accessory drive shaft 14 which is coupled to a fuel pump 15. This pump is supplied with fuel through a line 17 and delivers the fuel through a fuel metering valve 18 of the throttling type into line 19 which is connected through a shut-off valve 21 to the engine fuel inlet line 11. A regulating valve 22 maintains a constant pressure drop across the metering valve 18. The regulating valve is connected to the pump outlet by a line 23 and to the fuel line 19 by a branch line 25. The valve opens to return fuel through a bypass line 26 to the pump inlet so as to maintain a predetermined pressure drop across metering valve 18. The shut-off valve 21 is provided to close the fuel line when the engine is shut down. A pump pressure relief valve (not illustrated) is ordinarily provided also.

The metering valve 18 is operated by a pneumatic actuator 27 which operates primarily in response to compressor discharge pressure of the engine to meter or limit fuel during acceleration of the engine. The actuator 27 also is controlled directly or indirectly by a gas generator control 29 and a power turbine governor 30. The gas generator control responds to the speed of turbine 7 by means of a flyweight device 31 on a shaft 33 coupled to shaft 14 driven by the gas generator. The power turbine governor includes a flyweight speed responsive device 34 on a shaft 35 coupled through gearing 37 to the power turbine shaft 12.

As will be described, the gas generator control 29 acts as a governor to hold the gas generator at the preset speed and also includes means for enriching fuel during acceleration above a predetermined speed. The power turbine governor 30 acts to transmit a force of the gas generator control to modify its action and reduce fuel if the power turbine increases above a preset limit. These controls act by bleeding down or, in other words, modulating the pressures derived from the compressor of the the gas turbine and fed to the actuator 27 to control the fuel metering valve 18.

Explaining this more fully, an input to the fuel control of compressor discharge pressure is obtained through a line 38. Line 38 is connected through an orifice 39 to a manifold 40. A throttling valve 41 which connects manifold 40 to an atmospheric vent is coupled to means responsive to ambient atmospheric temperature. Valve 41, coacting with orifice 39, serves to modify compressor discharge pressure in manifold 40 in response to ambient temperature and thereby modify fuel flow in response to ambient temperature. Manifold 40 is connected through an orifice 42 to a governing pressure line 43 and through an orifice 45 to a fuel enrichment pressure line 46. These lines are connected to the actuator 27 and to the gas generator control 29.

The actuator 27 comprises two coaxial bellows 47 and 49. Open bellows 47 is of larger area than bellows 49, which is evacuated. Line 46 is connected to the space between the bellows and line 43 connects to the outside of bellows 47. These two bellows are connected to each other by a rod or stem 50 and to the metering valve 18 by a suitable linkage indicated by a continuation 51 of reciprocable rod 50. The arrangement is such that contraction of the bellows increases fuel flow. The valve is biased to reduce fuel by a spring force which may be from the inherent resiliency of the bellows 47 and 49. Thus, when the pressures in lines 43 and 46 increase concurrently with an increase in compressor discharge pressure this acts upon the difference of area of the two bellows to increase fuel flow. Speed is limited by bleeding air from line 43 by the gas generator control to be described, thus reducing fuel. Reduction in the fuel enrichment pressure in line 46 supplied to the actuator between the two bellows acting upon the difference of areas of the two bellows will increase fuel. In the operation of the system, this reduction in the enrichment pressure is also accomplished by the gas generator control.

Proceeding to the gas generator control 29, the flyball speed responsive device 31 acts against a roller 53 on a fuel enrichment lever 54 pivoted on a fulcrum 55. The opposite end of lever 54 mounts a half-ball valve member 57 which normally closes against a seat 58 connected to enrichment pressure line 46. A governor lever 59, also pivoted on the fulcrum 55, mounts a half-ball valve member 61 which may close the seat 62 at the end of governing pressure line 43. The enrichment lever 54 is coupled to an extension 63 of the governor lever by a light coil spring 65. When the engine is at rest or is operating below a predetermined speed this spring maintains an abutment 66 on the enrichment lever in contact with the governor lever. When the speed reaches the predetermined value, the flyball device rocks the enrichment lever until a second abutment 67 thereon is brought against the governor lever, this being accompanied by a slight extension of spring 65. This rocking motion of the enrichment lever opens the valve 57 and bleeds air from the line 46.

The governor lever 59 opens the valve 61 at a higher value of speed which could be a fixed value but, as illustrated, may be variably set by a gas generator control lever 69 which through a cam 70 rotates a bellcrank 71. A speeder spring 73 is connected between the bellcrank 71 and the governor lever 59. At some speed of the gas generator, depending upon the setting of governor 30, the flyball device opens valve 61 to bleed line 46 and thus reduces fuel flow.

Proceeding now to the power turbine governor 30, this embodies a governor essentially the same as that just described in the gas generator control except that the enrichment lever is absent and the flyball device 34 works directly on a governor lever 74. Lever 74 is biased by a spring 75 variably set by power turbine speed control 77. Lever 74 controls a half-ball valve 78, which upon overspeed of the power turbine, opens to bleed air from a line 79. Reduction of pressure in line 79 is effective to modify the action of the gas generator governor. Compressor discharge pressure line 38 is connected through a pressure regulating valve 81 to a controlled pressure line 82. Regulating valve 81 responds to ambient pressure and to the pressure in line 82 to hold the controlled pressure at a fixed level above atmospheric pressure. Line 82 is connected through an orifice 83 to power turbine overspeed line 79. Opening of valve 78 upon power turbine overspeed reduces the pressure in line 79 because of the drop through orifice 83. An accumulator 85 connected to line 79 slows the rate of change in pressure in line 79 in response to overspeed. Lines 79 and 82 are connected to opposite sides of a diaphragm 86 in the gas generator control 29. This diaphragm is connected to a push rod 87 which may engage the end 89 of the governor lever 59. The pressures in line 79 and 82 will be equal as long as valve 78 is closed. However, when this valve opens and reduces the pressure in line 79 the resulting pressure differential acts upon diaphragm 86 to exert a force on the governor arm 59 tending to open valve 61 and thus reduce fuel.

To summarize, the prior art fuel control embodies pressure responsive means 27 for regulating engine fuel which basically responds to compressor discharge pressure. The speed of the engine is limited and held at the desired value by bleeding pressure either directly through action of the gas generator control or indirectly through action of the power turbine governor on the gas generator control. The gas generator control acts at a given value of engine speed to open the enrichment valve 57, the resulting decrease in the enrichment pressure raising the fuel-air ratio in the engine. This action takes place at a speed above the surge-critical speed range.

Figure 3:
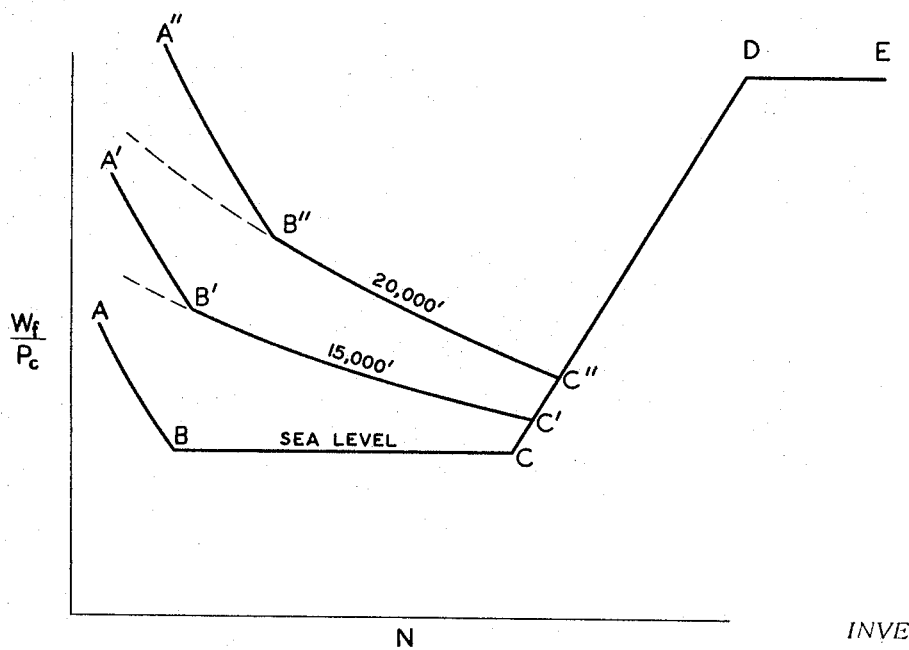
FIGURE 3 is a chart illustrating the effect of my invention on the fuel flow to the engine during acceleration.

The limits of fuel for acceleration may be clarified by reference to FIGURE 3 which the line A–B–C–D–E represents the maximum fuel supplied during engine acceleration. This line is in terms of the ratio of weight of fuel to compressor discharge pressure as a function of engine revolutions per minute. The horizontal line B–C represents fuel-air ratio at sea level (and at higher altitude with the prior control) before the action of the enrichment mechanism. When the speed reaches the level corresponding to point C, the enrichment valve 57 begins to open and fuel ratio increases along the line C–D. Beyond point D the fuel enrichment valve is fully open and the fuel ratio remains constant as indicated by line D–E. The lines for 15,000 feet and 20,000 feet of elevation represent the progressive enrichment of fuel with altitude effected by my invention, as will be explained.

Figure 2:
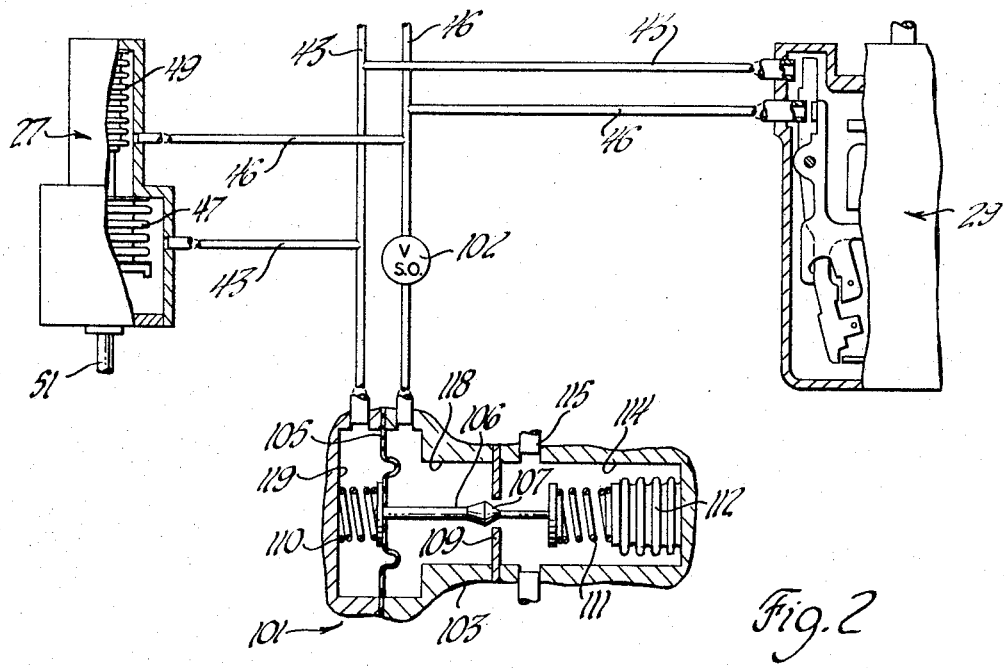
FIGURE 2 is a partial schematic fuel control drawing illustrating the addition of my invention to the system of FIGURE 1.

Referring now to FIGURE 2, illustrating my invention as incorporated in the previously described control, it will be noted that the actuator 27 and the gas generator control 29 are illustrated for orientation. The enrichment pressure line 46 and the governing pressure line 43 are connected to these devices as previously described. In accordance with my invention an altitude enrichment device 101 is connected between the lines 43 and 46. Preferably, a shut-off valve 102 is provided between the line 46 and the enrichment control 101 so that the latter may be disabled if desired during starting of the engine.

Altitude enrichment device 101 comprises a housing 103 within which is mounted a diaphragm 105. This diaphragm actuates a valve stem 106 bearing a movable valve member 107. This valve member may engage a seat defined by a circular opening in a valve seat plate 109 fixed in the body. The valve stem 106 is biased in the direction to close the valve by a compression spring 110 acting against the diaphragm and in the direction to open the valve by a second compression spring 111. Spring 111 is seated against an evacuated bellows 112. The chamber 114 within which the bellows is mounted is vented through openings 115 to atmosphere. The valve member 107 controls flow from a chamber 118 closed at one end by the diaphragm 105 to the chamber 114 and thus to atmosphere. The enrichment pressure line 46 is connected through valve 102 to the chamber 118. The governing pressure line 43 is connected to a chamber 119 at the opposite side of diaphragm 105. It will be seen that governing pressure tends to close the valve 107 and enrichment pressure tends to open it. The normal position of rest of the valve, assuming the pressures are balanced, is determined by springs 110 and 111 and is varied by the ambient atmospheric pressure responsive bellows 112 which shifts the abutment of spring 111, compressing the spring and tending to open the valve as atmospheric pressure decreases. As will be apparent, the valve 107 will remain seated below some pressure differential between the governing and enrichment pressures which varies with altitude. When the differential becomes greater than the setting resulting from the altitude pressure, the valve opens to bleed down the fuel enrichment pressure. The actual difference between the two pressures will be a function of the altitude pressure sensed by bellows 112. So long as the engine is accelerating below the point at which fuel is enriched by valve 57 (along line B–C in FIGURE 3) and below the setting of the governor, the pressures in lines 43 and 46 are normally equal. In the preferred embodiment of my invention as applied to a particular engine, the disposition of the springs is such that the valve 107 does not open and act to reduce the enrichment pressure until an altitude of approximately 8000 feet is reached. Barometric pressure is utilized as a measure of altitude. As the altitude increases above 8000 feet, the balance of the springs is such as to open the valve more and more with increasing altitude and thus to require a greater differential between the governing and enrichment pressures to close the valve.

Valve 107 has no effect once the enrichment valve 57 opens, since this lowers the fuel enrichment pressure much more substantially than the altitude enrichment valve. This mode of operation may be appreciated by reference to FIGURE 3 in which the line A′–B′–C′ represents fuel-air ratio at 15,000 feet and the line A″–B″–C″ represents fuel-air ratio at 20,000 feet altitude. The difference between lines A–B–C and A′–B′–C′ or A″–B″–C″ reflects the increase in fuel flow with altitude due to enrichment device 101. As previously pointed out, this curve is for a device in which enrichment begins at about 8000 feet. The points C′ and C″ are on the line C–D along which the speed enrichment valve 57 takes over and supersedes the altitude enrichment.

Thus, by the very simple addition shown in FIGURE 2, the control is enabled to supply the engine with a greater amount of fuel proportioned to the need therefor and tolerance thereof by the engine at higher altitudes. The result is that the engine accelerates rapidly rather than slowly at high altitudes and the safety and controllability of the aircraft are improved. It may be pointed out that the control as described may be applied to single shaft engines as well as gas coupled ones. If the turbine 7 drives both the compressor and the load, the power turbine governor 30 and the means by which it alters the operation of the gas generator control 29 are simply omitted.

If there is no second turbine and only one shaft as where the turbine 7 drives both the compressor and the load and turbine 9 is omitted, then the power turbine governor 30, the mechanical drive to it, the pressure regulating valve 81 and the devices supplied through it, and the mechanism 86, 87 in the gas generator control 29 are not required.

The detailed description of the preferred embodiment of my invention for the purpose of explaining the principles thereof is not to be considered as limiting the invention, since many modifications may be made by the exercise of skill in the art and the principles of the invention may be embodied in other control arrangements.

I claim:

1. A fuel control for a gas turbine engine comprising, in combination,
   means to meter fuel to the engine,
   control means therefor adapted to maintain the engine fuel to air ratio on a predetermined schedule during acceleration through a lower speed range and to increase the fuel to air ratio upon entering a higher speed range, and
   means responsive to an altitude-related condition coupled to the control means so as to increase the fuel to air ratio during acceleration in the lower speed range as altitude increases.

2. A fuel control for a gas turbine engine comprising, in combination,
   means to meter fuel to the engine,
   control means therefor adapted to maintain the engine fuel to air ratio on a predetermined schedule during acceleration through a lower speed range and to increase the fuel to air ratio upon entering a higher speed range,
   means deriving a pressure from the compressor of the engine to actuate the control means, and
   means responsive to an altitude-related condition coupled to the pressure-deriving means so as to increase the fuel to air ratio during acceleration in the lower speed range as altitude increases.

3. A fuel control for a gas turbine engine comprising, in combination,
   means to meter fuel to the engine,
   control means therefor adapted to maintain the engine fuel to air ratio substantially constant during acceleration through a lower speed range and to increase the fuel to air ratio upon entering a higher speed range, and
   means responsive to atmospheric pressure coupled to the control means so as to increase the fuel to air ratio during acceleration in the lower speed range as atmospheric pressure decreases.

4. A fuel control as recited in claim 3 in which the metering means responds to a pressure derived from compressor discharge pressure and both the said means for increasing the fuel to air ratio act to modify the derived pressure.

5. A fuel control for a gas turbine engine comprising, in combination,
   a metering valve to meter fuel to the engine,
   means operative to generate an enrichment pressure related to compressor discharge pressure of the engine,
   actuating means coupled to operate the metering valve and supplied with the enrichment pressure, the said actuating means being effective to increase fuel in response to decrease in the enrichment pressure,
   means operative to decrease the enrichment pressure above a predetermined speed of the engine,
   in combination with means operative to modulate the enrichment pressure as a function of a condition related to altitude below the said predetermined speed including
   a valve operable to bleed off the enrichment pressure, and
   means responsive to the altitude-related condition coupled to the valve so as to bias the valve in the valve-opening direction with increase in altitude so that the enrichment pressure is reduced at higher altitudes.

6. A fuel control for a gas turbine engine comprising, in combination,
   a metering valve to meter fuel to the engine,
   means operative to generate an enrichment pressure related to compressor discharge pressure of the engine,
   actuating means coupled to operate the metering valve and supplied with the enrichment pressure, the said actuating means being effective to increase fuel in response to decrease in the enrichment pressure, and
   means operative to decrease the enrichment pressure above a predetermined speed of the engine,
   in combination with means operative to modulate the enrichment pressure as a function of a condition related to altitude below the said predetermined speed including
   a valve operable to bleed off the enrichment pressure,
   means responsive to the enrichment pressure effective to bias the valve in the opening direction,
   spring means biasing the valve, and
   means responsive to the altitude-related condition coupled to the spring means so as to increase the spring bias in the valve-opening direction with increase in altitude,
   so that the enrichment pressure is reduced at higher altitudes.

7. A fuel control for a gas turbine engine comprising, in combination,
   a metering valve to meter fuel to the engine,
   means operative to generate a governing pressure related to compressor discharge pressure of the engine,
   means operative to generate an enrichment pressure related to compressor discharge pressure of the engine,
   actuating means coupled to operate the metering valve and supplied with the governing pressure and the enrichment pressure, the said actuating means being effective to increase fuel in response to increase in the governing pressure and to increase fuel in response to decrease in the enrichment pressure, means operative to decrease the enrichment pressure above a predetermined speed of the engine, and governing means operative to decrease the governing pressure upon overspeed of the engine, in combination with means operative to modulate the enrichment pressure as a function of a condition related to altitude below the said predetermined speed including a valve operable to bleed off the enrichment pressure, means responsive to the difference between the governing and enrichment pressures effective to bias the valve in the opening direction, spring means biasing the valve, and means responsive to the altitude-related condition coupled to the spring means so as to increase the spring bias in the valve-opening direction with increase in altitude, so that the enrichment pressure is reduced relative to the governing pressure at higher altitudes.

References Cited
UNITED STATES PATENTS 2,939,280    6/1960    Farkas _____ 60—39.28

JULIUS E. WEST, *Primary Examiner.*